(12) United States Patent
Park et al.

(10) Patent No.: US 10,605,311 B2
(45) Date of Patent: Mar. 31, 2020

(54) MOTOR SHAFT TRANSMISSION INTERFERENCE APPARATUS

(71) Applicant: HALLIBURTON ENERGY SERVICES, INC., Houston, TX (US)

(72) Inventors: Steven W. Park, Edmonton (CA); Geoffrey A. Samuel, Edmonton (CA); Steven Graham Bell, Red Deer (CA)

(73) Assignee: Halliburton Energy Service, Inc., Houston, TX (US)

(*) Notice: Subject to any disclaimer, the term of this patent is extended or adjusted under 35 U.S.C. 154(b) by 139 days.

(21) Appl. No.: 15/529,240

(22) PCT Filed: Jan. 28, 2015

(86) PCT No.: PCT/US2015/013187
§ 371 (c)(1),
(2) Date: May 24, 2017

(87) PCT Pub. No.: WO2016/122468
PCT Pub. Date: Aug. 4, 2016

(65) Prior Publication Data
US 2017/0343046 A1 Nov. 30, 2017

(51) Int. Cl.
*E21B 17/043* (2006.01)
*F16D 1/08* (2006.01)
(Continued)

(52) U.S. Cl.
CPC ............ *F16D 1/0829* (2013.01); *E21B 17/03* (2013.01); *E21B 17/043* (2013.01);
(Continued)

(58) Field of Classification Search
CPC ...... F16D 1/0829; F16D 1/116; F16D 1/0864; Y10T 403/62; E21B 17/076; E21B 17/03; E21B 17/04; E21B 17/043; E21B 17/16
(Continued)

(56) References Cited

U.S. PATENT DOCUMENTS 1,293,617 A * 2/1919 Obertop ............... F16J 9/061
277/493
2,022,355 A 11/1935 Klausmeyer
(Continued)

FOREIGN PATENT DOCUMENTS

CN 2046538 10/1989
CN 1209858 3/1999
(Continued)

OTHER PUBLICATIONS

International Patent Application No. PCT/US2015/013187, International Search Report and Written Opinion, dated Sep. 23, 2015, 13 pages.
(Continued)

*Primary Examiner* — Greg Binda
(74) *Attorney, Agent, or Firm* — Kilpatrick Townsend & Stockton LLP

(57) ABSTRACT

An interference apparatus is provided for a motor shaft transmission assembly. The interference apparatus may include split-ring shells and a retaining device. The interference apparatus may be mounted to an intermediate sleeve of the motor shaft transmission assembly. The interference apparatus is configured to prevent the loss of certain motor shaft transmission assembly components downhole in the event of a failure of the motor transmission due to dynamic loads.

21 Claims, 4 Drawing Sheets

(51) Int. Cl.
    *E21B 17/16* (2006.01)
    *E21B 17/03* (2006.01)
    *E21B 17/07* (2006.01)
    *F16D 1/116* (2006.01)
    *E21B 17/04* (2006.01)

(52) U.S. Cl.
    CPC ............ *E21B 17/076* (2013.01); *E21B 17/16* (2013.01); *F16D 1/0864* (2013.01); *F16D 1/116* (2013.01); *E21B 17/04* (2013.01); *Y10T 403/62* (2015.01)

(58) Field of Classification Search
    USPC .............. 277/435, 493; 16/2.1, 2.5; 175/320
    See application file for complete search history.

(56) References Cited

U.S. PATENT DOCUMENTS

| | | |
|---|---|---|
| 4,924,948 A | 5/1990 | Chuang et al. |
| 5,125,148 A * | 6/1992 | Krasnov ............... E21B 17/043 |
| 5,711,205 A | 1/1998 | Wolfer et al. |
| 7,445,061 B1 | 11/2008 | Falgout, Sr. et al. |
| 7,985,037 B2 | 7/2011 | Duggan |
| 7,987,930 B2 | 8/2011 | Purcell |
| 8,025,110 B2 | 9/2011 | Falgout, Jr. et al. |
| 8,100,200 B2 | 1/2012 | Wolfer |
| 2008/0185187 A1 | 8/2008 | Scott et al. |
| 2010/0187013 A1 | 7/2010 | Falgout, Jr. et al. |
| 2010/0187016 A1 | 7/2010 | Marshall et al. |
| 2010/0314172 A1 | 12/2010 | Underwood et al. |
| 2012/0314172 A1 | 12/2012 | Oohira |
| 2013/0186692 A1 | 7/2013 | Purcell |
| 2013/0213661 A1 | 8/2013 | Reimert et al. |
| 2014/0202707 A1 | 7/2014 | Howell et al. |
| 2018/0058151 A1 * | 3/2018 | Park ........................ E21B 17/03 |

FOREIGN PATENT DOCUMENTS

| | | |
|---|---|---|
| SU | 802494 | 2/1981 |
| SU | 894166 | 12/1981 |
| WO | 2013074865 | 5/2013 |
| WO | 2014126889 | 8/2014 |

OTHER PUBLICATIONS

Canadian Application No. CA2,970,134, Office Action dated Feb. 28, 2018, 3 pages.
Gulf Council Application No. GC2015-30630, Office Action dated Mar. 29, 2018, 5 pages.
Russian Application No. RU2017122818, Notice of Decision to Grant dated Jul. 2, 2018, 16 pages (4 pages of English Translation and 10 pages of Official Copy).
Russian Application No. RU2017122818, Office Action dated Apr. 6, 2018, 12 pages (5 pages of English Translation and 7 pages of Official Copy).

* cited by examiner

MOTOR SHAFT TRANSMISSION INTERFERENCE APPARATUS

CROSS-REFERENCE TO RELATED APPLICATION

This is a U.S. national phase under 35 U.S.C. 371 of International Patent Application No. PCT/US2015/013187, titled "Motor Shaft Transmission Interference Apparatus" and filed Jan. 28, 2015, the entirety of which is incorporated herein by reference.

TECHNICAL FIELD

The present disclosure relates generally to an assembly for a motor shaft transmission and, more particularly (although not necessarily exclusively), to a drive shaft catch for a downhole drilling motor assembly.

BACKGROUND

Drilling motors utilize fluid energy converted to mechanical energy to provide shaft rotation to a drill string or drill bit. Because the drilling motor is a highly loaded section of a drilling tool, it is prone to critical damage during motor transmission failure. Failure of the motor transmission may result in critical damage to the motor transmission assembly, including the separation of components from the transmission assembly. Where such separation occurs, these components may be lost downhole. The lost components dropped downhole can prevent further progression in drilling and can cause significant delays.

A procedure commonly known as "fishing" is sometimes used to retrieve the lost components, but this procedure is costly and time-consuming, and in certain instances may be ineffective. In some instances, the loss of components downhole can result in abandonment of a drilling project.

DETAILED DESCRIPTION

Certain aspects and examples of the present disclosure relate to a downhole motor assembly having an interference apparatus. The interference apparatus may include split-ring shells received in a groove of an intermediate sleeve and coupled to the intermediate sleeve by a retaining device. The split-ring shells are separate and independent of the bearing housing and the motor shaft. A spacer sleeve may be positioned between the interference apparatus and the bearing housing.

The split-ring shells of the interference apparatus may be U-shaped shells and may form a ring-shape when joined together. Part of the split-ring shells may extend radially from the intermediate sleeve. Should a break occur, the split-ring shells may catch on a stationary sleeve and prevent the loss of components downhole.

The terms "inner," "outer," "internal," "external," and "between," as used in the present disclosure may refer to a radial orientation toward or away from the center of the motor shaft transmission assembly. The terms "uphole" and "downhole," as used in the present disclosure may refer to an axial orientation toward or away from the surface.

Figure 1:
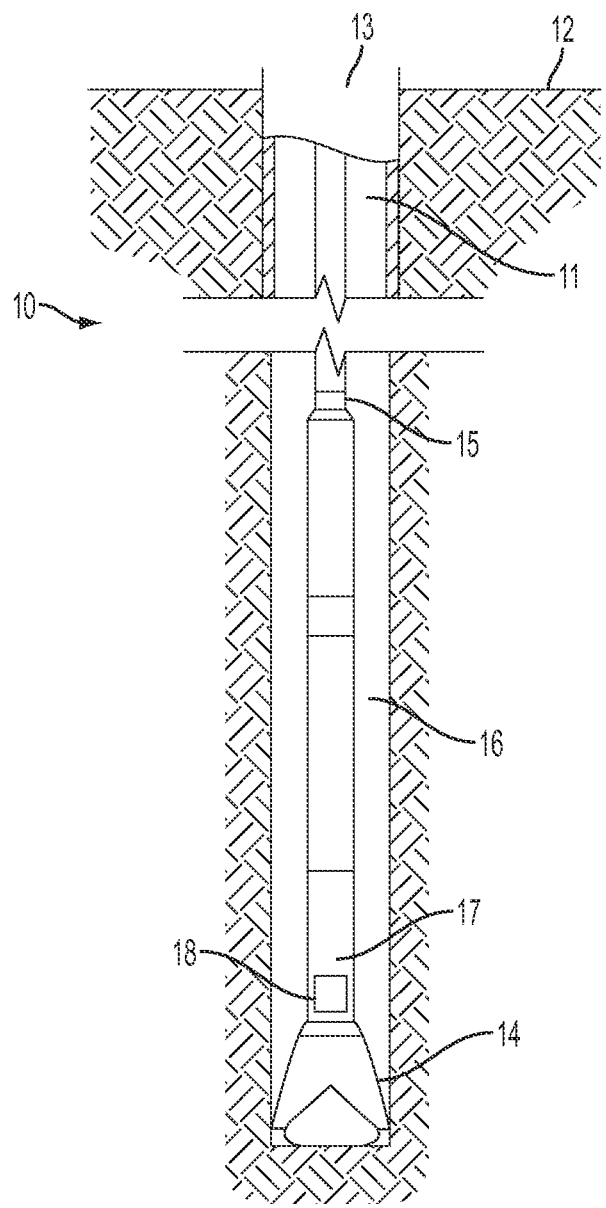
FIG. 1 is a cross-sectional schematic diagram depicting a drilling system that includes a motor shaft transmission assembly with an interference apparatus in a lower end of a downhole motor assembly according to one aspect of the present disclosure.

Various aspects of the present disclosure may be implemented in various drilling systems. FIG. 1 illustrates an example of such drilling system 10. The drill string 11 of a drilling rig (not shown) may include segmented pipes that may extend below the surface 12 in a borehole, such as a wellbore 13. The drill string 11 may transmit drilling fluid and the torque necessary to operate a drill bit 14. Also, the weight of the drill string 11 may provide an axial force on the drill bit 14.

The drill string 11 may include at least a drill pipe 15 and a bottom hole assembly 16. The bottom hole assembly 16 may be made up of various components, such as a downhole motor assembly 17 and the drill bit 14.

Though placement of the assemblies disclosed herein may vary without departing from the scope of the present subject matter, the assemblies of the present disclosure may be included in the lower end of the downhole motor assembly 17 and near the drill bit 14. For example, the motor shaft transmission assembly 18 depicted in FIG. 1 represents a placement according to one aspect. Placement of the assemblies as close to the drill bit 14 as possible may reduce the moment arm load induced from directional drilling. Reducing the moment arm load may result in longevity of the motor assembly and bearings of the drilling installation, and may reduce the likelihood of failure of the motor.

During operation of the drilling system, dynamic loads may be placed on a drill motor by the action of the drill bit 14 and by drill string 11 vibrations. In certain instances, the dynamic loads may cause the drill motor to fail and components of the motor shaft transmission assembly 18 to separate. The motor shaft transmission assembly 18 can include an interference apparatus to prevent the loss of components.

Figure 2:
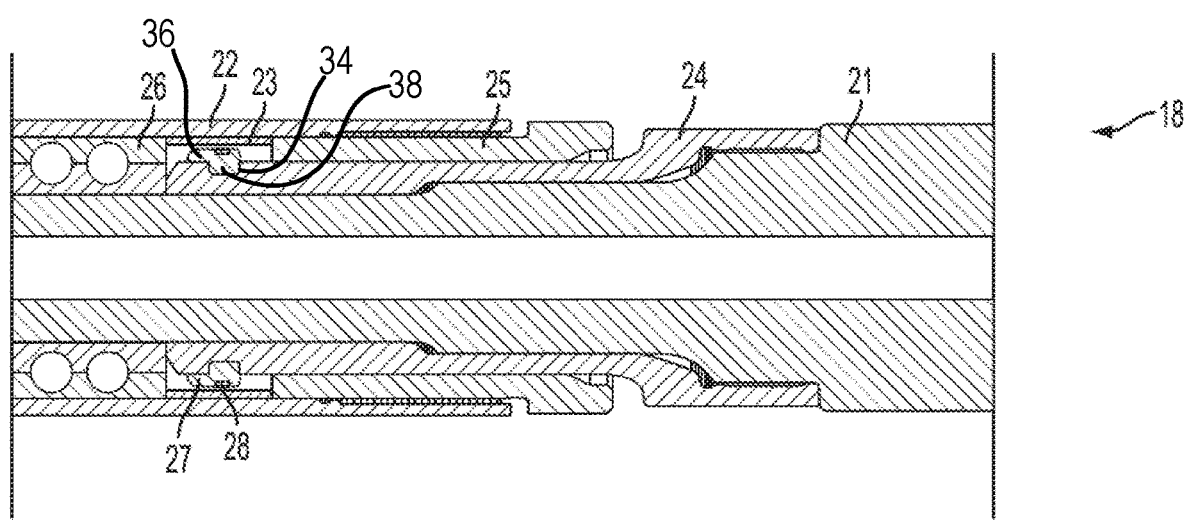
FIG. 2 is a cross-sectional view of a motor shaft transmission assembly according to one aspect of the present disclosure.

FIG. 2 illustrates a cross-sectional view of a motor shaft transmission assembly 18 with an interference apparatus, according to one aspect. The interference apparatus can be designed to prevent components of the motor shaft transmission assembly 18 from falling, or being lost, downhole in the event of separation. In this aspect, the motor shaft transmission assembly 18 includes a motor shaft 21 and a bearing housing 22 that supports the motor shaft 21 and is coupled uphole to the drill pipe 15. The motor shaft transmission assembly 18 also includes a spacer sleeve 23, an intermediate sleeve 24, a stationary sleeve 25, an axial thrust bearing 26, and an interference apparatus. The interference apparatus includes split-ring shells 27 and a band 28.

In FIG. 2, the interference apparatus [27, 28] is mounted to the intermediate sleeve 24 uphole of an enlarged portion of the motor shaft 21 where the intermediate sleeve 24 is coupled to the motor shaft 21. The interference apparatus [27, 28] is radially positioned between the intermediate sleeve 24 and bearing housing 22, and is separated from the bearing housing 22 by a spacer sleeve 23. The interference apparatus [27, 28] is independent of the bearing housing 22. In interference apparatus [27, 28] is axially positioned between the axial thrust bearing 26 (on the uphole side) and the stationary sleeve 25 (on the downhole side).

In FIG. 2, the split-ring shells 27 includes two curved components, each configured in a half-circle or "U" shape, such that when joined together, the split-ring shells 27 form a ring shape. Although two components are shown, the split-ring shells 27 according to various examples may include more than two shells. In some aspects, the cross-section of the split-ring shells 27 may have an "L" shape with two perpendicular legs or edges 36, 38. The intermediate sleeve 24 may be profiled with a groove 34 that is sized to receive one leg 38 of the split-ring shells 27. The second leg 36 of the split-ring shells 27 may abut (e.g., pressed flush against) the outer surface of the intermediate sleeve 24 when the first leg 38 is received in the groove 34 of the intermediate sleeve 24, as shown in FIG. 2.

The split-ring shells 27 may be mounted to the intermediate sleeve 24 by the band 28. When mounted to the intermediate sleeve 24, the split-ring shells 27 may be joined together around the intermediate sleeve such that the split-ring shells 27 form a ring shape that encircles the intermediate sleeve 24. The outer diameter of the split-ring shells 27 may be greater than the outer diameter of the intermediate sleeve 24 near the mounting point of the split-ring shells 27 such that the outer diameter of the split-ring shells 27 radially extends beyond the outer diameter of the intermediate sleeve 24 and an inner diameter of the stationary sleeve 25 when the split-ring shells 27 are mounted in the groove 34 of the intermediate sleeve 24.

The band 28 of the interference apparatus may be coupled to the outer surface (along the outer diameter) of the split-ring shells 27. The split-ring shells 27 may include an indentation on the outer surface. The indentation can be sized to receive the band 28. The inner diameter of the band 28 may be sized to secure the split-ring shells 27 to the intermediate sleeve 24. In some examples, the outer diameter of the band 28 may equal to the outer diameter of the split-ring shells 27 such that the outer surface of band 28 creates a continuous surface with the outer surface of the split-ring shells 27 when the band 28 is received by the indentation in the split-ring shells 27. In other examples, the band 28 can extend beyond the diameter of the split-ring shells 27. The split-ring shells 27 may include steel or similar material, or otherwise may be rigid. The band 28 may be rigid or flexible and may be made of a material strong enough to securely mount the split-ring shells 27 to the intermediate sleeve 24. The band 28 may be coupled to the split-ring shells 27 by sliding, snapping, pushing, or otherwise inserting the band into the indentation in the split-ring shells 27, or it may be welded, fastened, or otherwise joined around the indentation in the split-ring shells.

The intermediate sleeve 24 of the motor shaft transmission assembly 18 may be positioned between the motor shaft 21 and the interference apparatus, and may be coupled to an enlarged portion of the motor shaft 21 as shown in FIG. 2. The intermediate sleeve 24 may be a rotating bearing and may not be secured to the bearing housing 22. In some aspects, the motor shaft transmission assembly 18 may also include a stationary sleeve 25 that is positioned between the intermediate sleeve 24 and a bearing housing 22. The stationary sleeve 25 may be coupled to the bearing housing 22 and may be configured to support the motor shaft 21 in the radial direction.

In some aspects, the motor shaft transmission assembly may also include a spacer sleeve 23 and an axial thrust bearing 26. The axial thrust bearing 26 may contain the motor shaft 21 in the axial direction. The spacer sleeve 23 may place axial pre-load on the axial thrust bearing 26. As illustrated in FIG. 2, the spacer sleeve 23 may be positioned between the interference apparatus and the bearing housing 22. The axial thrust bearing 26 may be positioned between the motor shaft 21 and the bearing housing 22.

Following a failure of the drill motor, the interference apparatus of the motor shaft transmission assembly 18, the interference apparatus may prevent certain components of the motor shaft transmission assembly 18 from falling, or being lost, downhole in the event of separation. For example, when separation occurs, the outer surface of the split-ring shells 27 may create an interference with the up-hole axial end of the stationary sleeve 25, preventing the interference apparatus from moving in a downhole direction beyond the up-hole axial end of the stationary sleeve 25. When the split-ring shells 27 contact the stationary sleeve 25, there may be a moment placed on the split-ring shells 27. The L-shape of the cross-section of the split-ring shells 27 can support the moment-loading and can help prevent the split-ring shells from rolling out from the intermediate sleeve 24. Because the split-ring shells 27 may be mounted to the intermediate sleeve 24, the interference of the split-ring shells 27 with the stationary sleeve 25 may prevent the intermediate sleeve 24 from falling downhole. Similarly, because the intermediate sleeve 24 is coupled to the motor shaft 21, the motor shaft 21 and any other components attached thereto (e.g., a drill bit 14) may be prevented from falling downhole.

Figure 3:
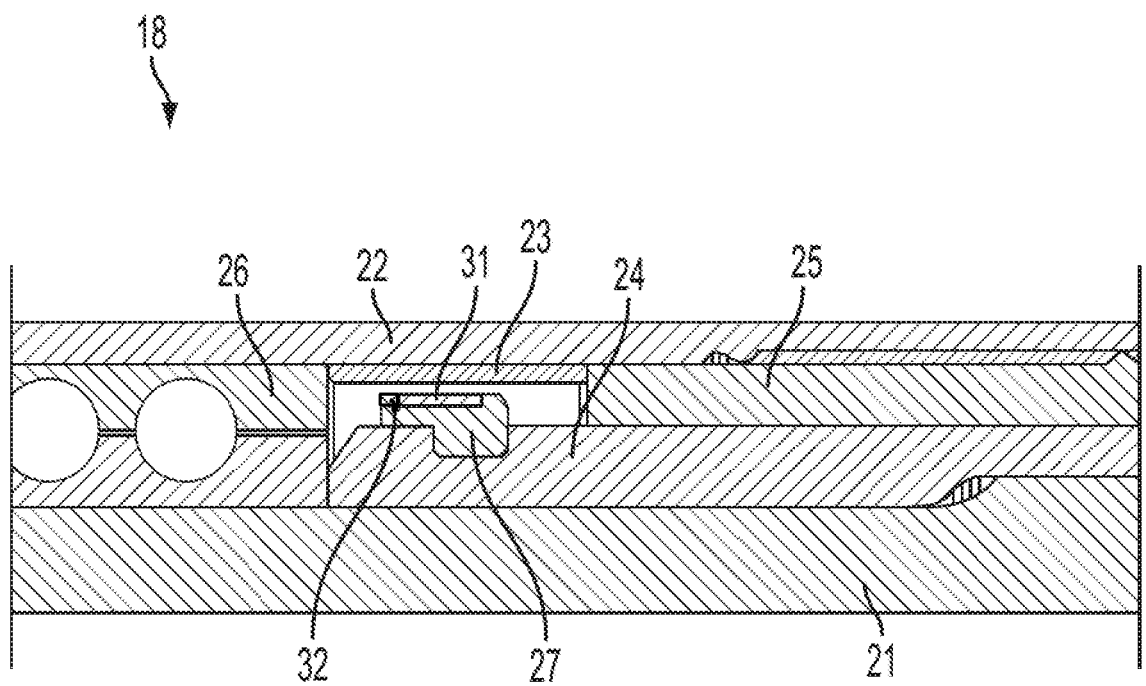
FIG. 3 is a cross-sectional view of part of the motor shaft transmission assembly according to one aspect of the present disclosure.
Figure 4:
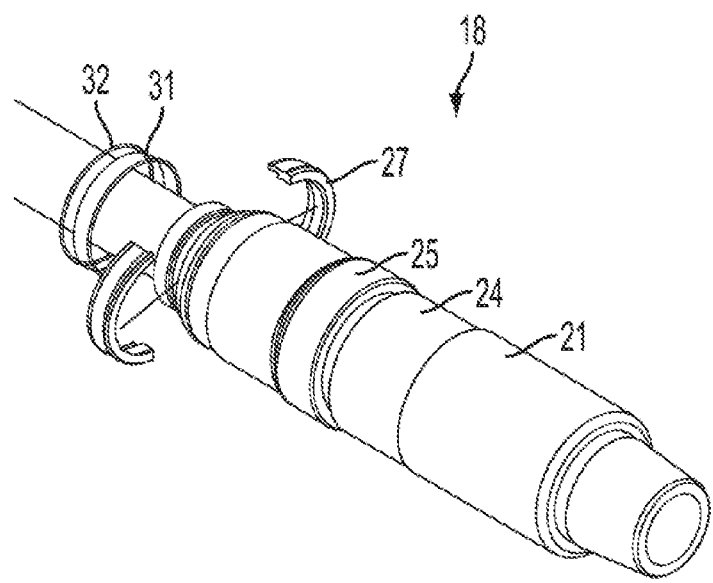
FIG. 4 is a prospective view of the downhole motor assembly according to an aspect of the present disclosure.

Various types of retaining devices, in addition to a band, can be used to secure split-ring shells. FIGS. 3 and 4 illustrate a motor shaft transmission assembly 18 having an interference apparatus according to another aspect with a different retaining device. FIG. 3 depicts an enlarged (relative to FIG. 2) cross-sectional view of the motor shaft transmission assembly 18 with the interference apparatus, including the split-ring shells 27, a cylindrical shell 31, and a ring 32, installed in the motor shaft transmission assembly 18. FIG. 4 shows a perspective view of the motor shaft transmission assembly 18 with exploded partially disassembled view of the interference apparatus, including the split-ring shells 27, cylindrical shell 31, and ring 32.

The outer surface of the split-ring shells 27 may have two sections (or ends) having different outer diameters. The downhole end of the outer surface of the split-ring shells 27 may have an outer diameter greater than the outer diameter of the uphole end of the split-ring shells 27. The split-ring shells 27 may be mounted to the intermediate sleeve 24 by a cylindrical shell 31 coupled to the outer surface of the uphole end of the split-ring shells 27. The cylindrical shell 31 may be coupled to the split-ring shells 27 by sliding, pushing, or otherwise placing the cylindrical shell 31 onto the outer surface of the uphole end such that it contacts an axial edge of the downhole end of the split-ring shells 27. The cylindrical shell 31 may be sized such that it secures the split-ring shells 27 to the intermediate sleeve 24. A ring 32 may be coupled to the split-ring shells 27 such that it prevents the cylindrical shell 31 from decoupling from the split-ring shells 27. The ring 32 may be coupled to the split-ring shells 27 by sliding, snapping, pushing, or otherwise placing the ring 32 onto the intermediate sleeve and contacting an axial edge of the cylindrical shell 31. In some aspects, the split-ring shells 27 may include an indentation for receiving the ring 32. In such aspects, the ring 32 may have an outer diameter such that the outer surface of the ring 32 radially extends beyond the outer surface of the uphole end of the split-ring shells 27 when the ring 32 is received into the indentation of the split-ring shells 27.

The cylindrical shell 31 may be made of steel or similar material, or otherwise may be rigid. The ring 32 may be rigid or flexible and may be made of a material strong enough to secure the cylindrical shell 31 to the split-ring shells.

Figure 5:
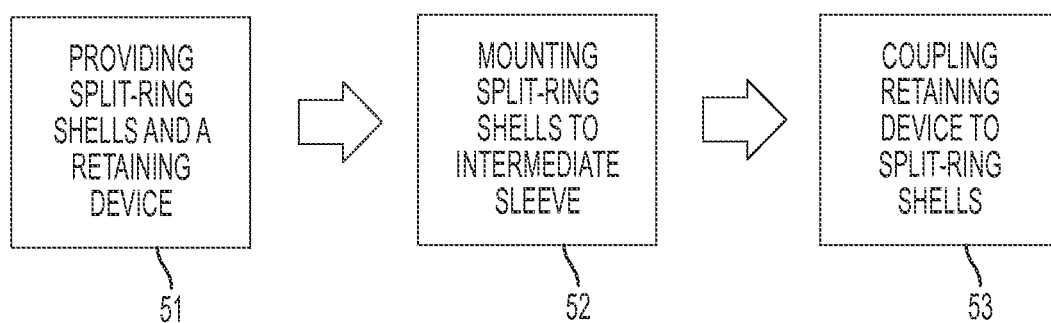
FIG. 5 is a flowchart depicting a process for installing an interference apparatus in a motor shaft transmission assembly according to one aspect of the present disclosure.

FIG. 5 shows a process for installing an interference apparatus in a motor shaft transmission assembly. The process shown in FIG. 5 is described with reference to FIGS. 3 and 4, but can be applied to other examples. In block 51, split-ring shells 27 and a retaining device may be provided. The split-ring shells 27 may include two or more components that form a ring shape when joined together (e.g., the split-ring shells 27 illustrated above in FIG. 4). The split-ring shells 27 may be made of the same material as other components of the motor shaft transmission assembly 18 (e.g., steel) and may be rigid and strong enough to withstand any load on the split-ring shells 27 in the event of contact with the stationary sleeve 25 after separation. In some aspects, the retaining device may be a band. The band may be a retaining ring, a spiral ring, a band strip, a clamp, or other fastener, and may be flexible or rigid. The band 28 may be made from a material strong enough to prevent the split-ring shells from demounting from an intermediate sleeve 24 during operation of the drilling system 10 and after separation of components of the motor shaft transmission assembly 18.

In other aspects, the retaining device may include a cylindrical shell 31 and a ring 32. The cylindrical shell 31 may be made of the same material as other components of the motor shaft transmission assembly 18 (e.g., steel) and may be rigid and strong enough to prevent the split-ring shells 27 from demounting from an intermediate sleeve 24 during operation of the drilling system 10 and after separation of components of the motor shaft transmission assembly 18. The ring 32 may be a retaining ring, a spiral ring, a band strip, a clamp, or other fastener known in the art, and may be flexible or rigid. The ring 32 may be made from a material strong enough to prevent the cylindrical shell from decoupling from the split-ring shells during operation of the drilling system 10 and after separation of components of the motor shaft transmission assembly 18.

In block 52, the split-ring shells 27 may be mounted to an intermediate sleeve 24 of the motor shaft transmission assembly 18. In some aspects, the split-ring shells 27 may be mounted to the intermediate sleeve 24 by inserting one leg of the split-ring shells into a groove profiled into the intermediate sleeve 24 that is sized to receive the leg of split-ring shells 27. The split-ring shells 27 may be joined together around the intermediate sleeve 24 such that the split-ring shells 27 form a ring shape that encircles the intermediate sleeve 24.

In block 53, a retaining device is coupled to the split-ring shells. In some aspects, the split-ring shells 27 may include an indentation on the outer surface of the split-ring shells that is sized to receive a band 28. The band 28 may be slid, snapped, pushed, or otherwise inserted into the indentation of the split-ring shells 27 to prevent the split-ring shells 27 from demounting from the intermediate sleeve 24. In other aspects, the split-ring shells 27 may include an outer surface having two ends having different outer diameters. The outer diameter of the downhole end of the split-ring shells 27 may be greater than the outer diameter of the uphold end of the split-ring shells 27. A cylindrical shell 31 may be slid onto the uphole end of the split-ring shells 27 until the cylindrical shell 31 reaches, or makes contact with, an axial edge of the downhole end of the split-ring shells 27. A ring may be slid onto the uphole end of the split-ring shells 27 such that the ring 32 prevents the cylindrical shell 31 from sliding off the uphole end of the split-ring shells 27. In some aspects, the outer surface of the uphole end of the split-ring shells 27 may include an indentation sized to receive the ring 32. The ring 32 may have an outer diameter such that the outer surface of the ring 32 radially extends beyond the outer surface of the uphole end of the split-ring shells 27 when the ring 32 is received into the indentation of the split-ring shells 27.

The foregoing description of the examples, including illustrated examples, has been presented only for the purpose of illustration and description and is not intended to be exhaustive or to limit the subject matter to the precise forms disclosed. Numerous modifications, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A motor shaft transmission assembly comprising:
   a motor shaft coupled to a drill bit for drilling a wellbore;
   an intermediate sleeve positioned coaxially around the motor shaft, the intermediate sleeve being coupled to the motor shaft;
   a stationary sleeve positioned coaxially around the intermediate sleeve, the stationary sleeve being separate from the intermediate sleeve;
   split-ring shells at least partially received in a groove of the intermediate sleeve, at least part of the split-ring shells extending radially outwardly from an outer diameter of the intermediate sleeve; and
   a retaining device for coupling the split-ring shells to the intermediate sleeve.

2. The motor shaft transmission assembly of claim 1, wherein the at least part of the split-ring shells extending radially outwardly from an outer diameter of the intermediate sleeve prevents a loss of motor shaft transmission assembly components downhole after a separation of the motor shaft transmission assembly components is due to dynamic loads produced during operation of the motor shaft transmission assembly.

3. The motor shaft transmission assembly of claim 1, wherein the split-ring shells have an outer diameter that is greater than an inner diameter of the stationary sleeve, wherein the stationary sleeve is positioned between the intermediate sleeve and a bearing housing, and wherein the split-ring shells are independent of the bearing housing.

4. The motor shaft transmission assembly of claim 1, further comprising a bearing positioned coaxially around the motor shaft and a bearing housing positioned coaxially around the bearing, wherein an interference apparatus is positioned between the intermediate sleeve and the bearing housing.

5. The motor shaft transmission assembly of claim 1, wherein the retaining device comprises a band coupled to the split-ring shells in an indentation of the split-ring shells sized to receive the band.

6. The motor shaft transmission assembly of claim 1, wherein the split-ring shells include a first end and a second end, the second end having an outer diameter greater than an outer diameter of the first end,
   wherein the retaining device comprises a cylindrical shell and a ring, the cylindrical shell being coupled to the first end of the split-ring shells, and the ring being coupled to the first end of the split-ring shells and positioned to prevent the cylindrical shell from decoupling from the split-ring shells.

7. The motor shaft transmission assembly of claim 6, wherein the first end of the split-ring shells includes an indentation sized to receive the ring,
wherein the ring is further positioned in the indentation.

8. The motor shaft transmission assembly of claim 1, wherein a cross-sectional shape of the split-ring shells is an L-shape having a first leg and a second leg, the first leg shaped for being received in the groove of the intermediate sleeve and the second leg shaped for being coupled to an outer wall of the intermediate sleeve.

9. The motor shaft transmission assembly of claim 1, further comprising a spacer sleeve that is positioned between the intermediate sleeve and a bearing housing for separating the intermediate sleeve from the bearing housing, the spacer sleeve being separate from the intermediate sleeve and the bearing housing, wherein an interference apparatus is radially positioned between the intermediate sleeve and the spacer sleeve.

10. A motor shaft transmission assembly, comprising:
a motor shaft coupled to a drill bit for drilling a wellbore;
an intermediate sleeve coupled to the motor shaft, the intermediate sleeve being positioned coaxially around the motor shaft, wherein the intermediate sleeve has a groove; and
split-ring shells received in the groove of the intermediate sleeve, wherein at least part of the split-ring shells extends radially outwardly from an outer diameter of the intermediate sleeve.

11. The motor shaft transmission assembly of claim 10, wherein the at least part of the split-ring shells extending radially from an outer diameter of the intermediate sleeve prevents a loss of motor shaft transmission assembly components downhole after a separation of the motor shaft transmission assembly components due to dynamic loads produced during operation of the motor shaft transmission assembly.

12. The motor shaft transmission assembly of claim 10, further comprising a retaining device coupling the split-ring shells to the intermediate sleeve, wherein the split-ring shells include in an indentation, the retaining device comprises a band coupled to the split-ring shells and positioned in the indentation, and the indentation is sized to receive the band.

13. The motor shaft transmission assembly of claim 10, wherein the split-ring shells include a first end and a second end, the second end having an outer diameter greater than an outer diameter of the first end, and further comprising:
a retaining device that includes a cylindrical shell and a ring, the cylindrical shell being coupled to the first end of the split-ring shells, and the ring being coupled to the first end of the split-ring shells and positioned to prevent the cylindrical shell from decoupling from the split-ring shells.

14. The motor shaft transmission assembly of claim 10, further comprising a bearing housing that includes a bearing, wherein the intermediate sleeve is positioned adjacent to the bearing within the bearing housing.

15. The motor shaft transmission assembly of claim 14, wherein the bearing includes an axial thrust bearing that is positioned radially between the motor shaft and the bearing housing.

16. The motor shaft transmission assembly of claim 14, further comprising a spacer sleeve that is separate from the intermediate sleeve and the bearing housing, the spacer sleeve being positioned between the intermediate sleeve and the bearing housing, wherein the split-ring shells are radially positioned between the intermediate sleeve and the spacer sleeve.

17. The motor shaft transmission assembly of claim 10, further comprising a stationary sleeve that is separate from and positioned coaxially around the intermediate sleeve, wherein an axial end of the stationary sleeve is positioned to abut the split-ring shells in response to a separation of the motor shaft transmission assembly components.

18. A method for installing an interference apparatus for a motor shaft transmission assembly, comprising:
providing split-ring shells, retaining device, an intermediate sleeve, and a motor shaft coupled to a drill bit for drilling a wellbore;
coupling the intermediate sleeve coaxially around the motor shaft;
mounting the split-ring shells to the intermediate sleeve of the motor shaft transmission assembly, wherein at least part of the split-ring shells extends radially outwardly from an outer diameter of the intermediate sleeve; and
coupling the retaining device to the split-ring shells such that the retaining device prevents the split-ring shells from demounting from the intermediate sleeve.

19. The method of claim 18, wherein mounting the split-ring shells to the intermediate sleeve includes:
inserting a portion of the split-ring shells into a groove in the intermediate sleeve sized to receive the portion of the split-ring shells; and
joining the split-ring shells such that the split-ring shells form a ring shape that encircles the intermediate sleeve.

20. The method of claim 18, wherein providing the retaining device includes providing a band,
wherein mounting the retaining device to the split-ring shells includes inserting the band into an indentation in the split-ring shells sized to receive the band.

21. The method of claim 18, wherein providing the retaining device includes providing a cylindrical shell and a ring,
wherein mounting the retaining device to the split-ring shells includes:
sliding the cylindrical shell onto a first end of the split-ring shells until the cylindrical shell reaches a second end of the split-ring shells, the second end having an outer diameter greater than an outer diameter of the first end; and
inserting the ring onto the first end of the split-ring shells to prevent the cylindrical shell from sliding off the first end of the split-ring shells.

* * * * *